(12) United States Patent
Osborne

(10) Patent No.: US 7,784,637 B2
(45) Date of Patent: Aug. 31, 2010

(54) MULTI-PIECE SEAL

(75) Inventor: James R. Osborne, Davisburg, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 737 days.

(21) Appl. No.: 11/708,892

(22) Filed: Feb. 21, 2007

(65) Prior Publication Data
US 2008/0197578 A1  Aug. 21, 2008

(51) Int. Cl.
*B65D 33/00* (2006.01)
*B65D 88/12* (2006.01)
*B60P 3/00* (2006.01)

(52) U.S. Cl. .................. 220/562; 220/86.1; 277/652
(58) Field of Classification Search .............. 220/86.1, 220/86.2, 562; 277/590, 591, 277, 652
See application file for complete search history.

(56) References Cited

U.S. PATENT DOCUMENTS

| | | | |
|---|---|---|---|
| 3,467,448 A | 9/1969 | Galle | |
| 3,788,654 A | 1/1974 | Mandley | |
| 3,918,726 A | 11/1975 | Kramer | |
| 4,248,439 A | 2/1981 | Haslett | |
| 4,262,914 A | 4/1981 | Roley | |
| 4,344,629 A | 8/1982 | Oelke | |
| 4,364,572 A | 12/1982 | Yamamoto et al. | |
| 4,426,091 A | 1/1984 | Baylor | |
| 4,568,090 A | 2/1986 | Westemeier | |
| 4,635,945 A * | 1/1987 | Beck | 277/530 |
| 5,265,890 A | 11/1993 | Balsells | |
| 5,860,680 A | 1/1999 | Drijver et al. | |
| 5,879,010 A | 3/1999 | Nikanth et al. | |
| 6,012,904 A | 1/2000 | Tuckey | |
| 6,091,175 A | 7/2000 | Kinsinger | |
| 6,305,483 B1 | 10/2001 | Portwood | |
| 6,332,555 B1 | 12/2001 | Stangier | |
| 6,357,618 B1 | 3/2002 | Kloess et al. | |
| 6,357,759 B1 | 3/2002 | Azuma et al. | |
| 6,419,236 B1 | 7/2002 | Janian | |
| 6,450,502 B1 | 9/2002 | Baehl et al. | |
| 6,497,415 B2 | 12/2002 | Castleman et al. | |
| 6,502,826 B1 | 1/2003 | Schroeder et al. | |
| 6,533,288 B1 | 3/2003 | Brandner et al. | |
| 6,691,888 B2 | 2/2004 | Moser et al. | |
| 6,698,613 B2 | 3/2004 | Goto et al. | |
| 6,755,422 B2 | 6/2004 | Potter | |
| 6,910,692 B2 * | 6/2005 | Malone et al. | 277/556 |
| 2002/0158419 A1 | 10/2002 | Zitting et al. | |
| 2004/0239047 A1* | 12/2004 | Kent et al. | 277/628 |

* cited by examiner

*Primary Examiner*—Harry A Grosso
(74) *Attorney, Agent, or Firm*—Reising Ethington P.C.

(57) ABSTRACT

A multi-piece seal has an outer member and an inner member partly disposed in the outer member. In cross section, the outer member has a C-shape and defines a channel, and the inner member is round and has a pair of lobes extending away from its body.

6 Claims, 4 Drawing Sheets

MULTI-PIECE SEAL

FIELD OF THE INVENTION

This invention relates generally to automotive fuel system polymeric seals, and more particularly to multiple piece polymeric seals having inner members disposed within outer members.

BACKGROUND OF THE INVENTION

Automotive fuel system polymeric seals are deformable components that are widely used in many different applications to make a pressure-tight joint between parts, and include radial seals and axial seals. In use, radial seals are compressed in a radial direction perpendicular to a seal centerline on radially inside and outside surfaces of the radial seal's cross section, whereas axial seals are compressed in an axial direction parallel to a seal centerline on axially opposed surfaces of the axial seal's cross section. Axial seals, in particular, are widely used to seal openings of containers.

For example, axial seals are often used to seal an opening in a fuel tank and are disposed in a flange-type joint between a mounting flange of a fuel delivery module and an outer surface of the fuel tank. Unfortunately, however, an axial seal may not provide a substantially permeation-free joint between the mounting flange and the fuel tank. More specifically, due to relatively high volatility, hydrocarbons quickly vaporize from liquid fuel in the fuel tank and may escape to the atmosphere through the flange-type joint, if it is not suitably sealed. In fact, volatile fuel vapors may permeate right through the axial seal itself, in an otherwise pressure-tight sealed joint.

To address such leakage, the California Air Resources Board (CARB) has adopted regulations requiring vehicles to operate with a combination of a Super Ultra Low Emission Level (SULEV) and zero evaporative emissions of fuel, constituting a Partial Zero Emission Vehicle (PZEV). Zero evaporative emissions means no gases may be emitted from the vehicle's fuel tank or other fuel delivery systems.

One approach to providing a permeation-free flange-type joint to comply with the PZEV regulations is to use a special low-permeation type of seal material to seal a joint. But such materials are typically cost prohibitive for many applications, are relatively hard and, thus, difficult to compress during assembly, and usually exhibit low elasticity at low temperature.

SUMMARY OF THE INVENTION

A multi-piece seal provides a pressure-tight seal against liquid leaks between two components, economically resists permeation of vapors through the multi-piece seal itself, and preferably reduces likelihood of seal members twisting relative to one another and the likelihood of the seal itself twisting between the two components.

One implementation of a presently preferred multi-piece seal may include an outer member and an inner member. The outer member can have a C-shaped cross section and a channel. The inner member can be round in cross section and can be received partly in the outer member's channel. The inner member can have a pair of lobes that extend out of the channel.

Another implementation of a presently preferred multi-piece seal may include an outer member made of a permeation-resistant elastomeric material and an inner member made of another permeation-resistant elastomeric material. The outer member can define a first sealing surface against a fuel delivery module, and a second sealing surface against a fuel tank wall. The inner member can define a third sealing surface against the fuel delivery module, and a fourth sealing surface against the fuel tank wall.

BRIEF DESCRIPTION OF THE DRAWINGS

These and other objects, features and advantages of the present invention will be apparent from the following detailed description of the preferred forms and best mode, appended claims, and accompanying drawings in which:

DETAILED DESCRIPTION OF PREFERRED FORMS

Figure 1:
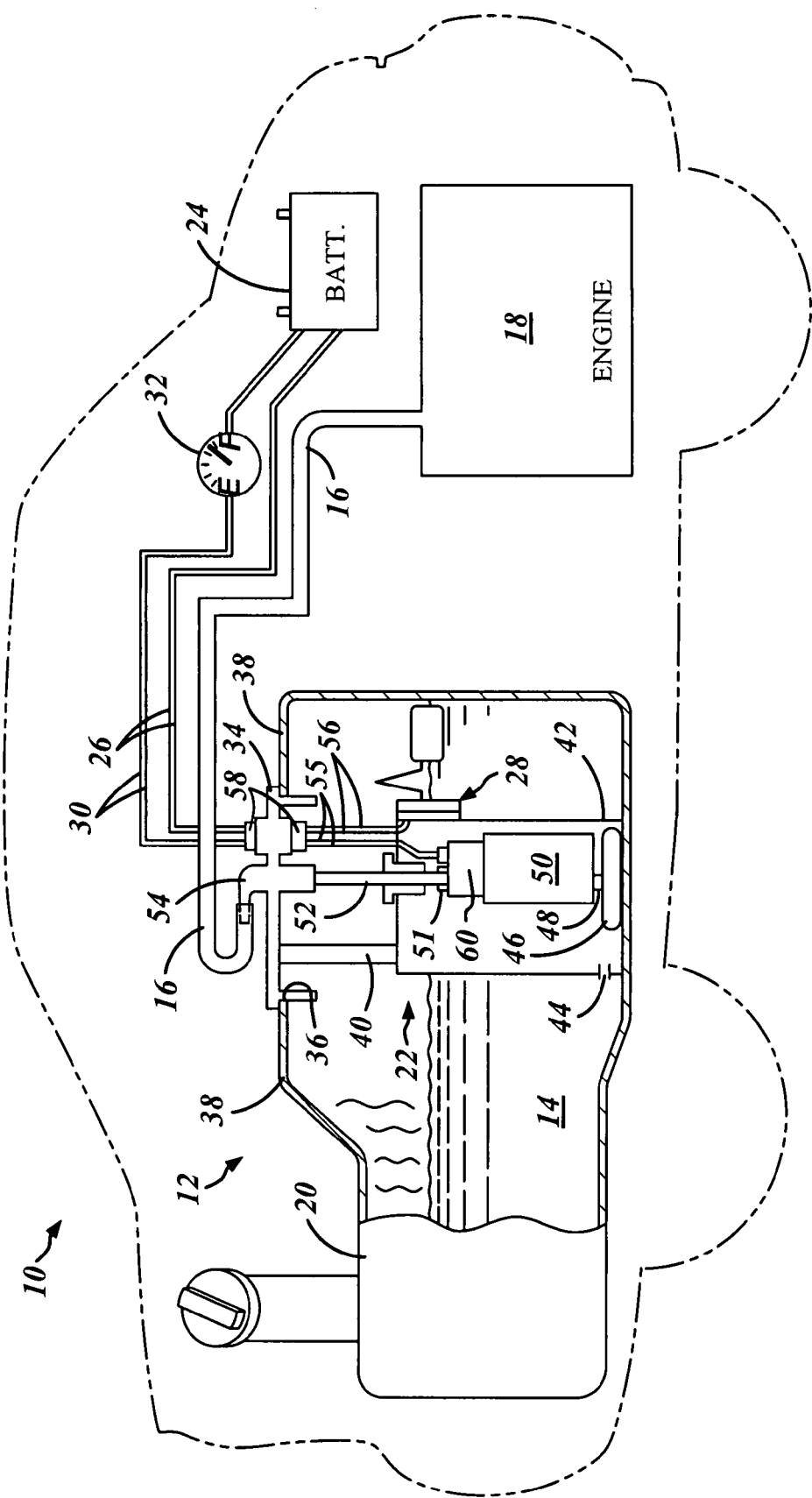
FIG. 1 is a schematic view of a vehicle including a fuel tank assembly including a fuel tank, a fuel delivery module, and a sealed joint therebetween including a multi-piece seal between a flange of the fuel delivery module and a wall of the fuel tank.

In general, and before referring to the drawing figures, one embodiment of an axial seal is described. The embodiment may be used in any desired application, but is particularly well-adapted for reducing permeation and evaporative emissions of volatile fuel from escaping through an axial flange joint of a fuel tank assembly of an automobile, or any number of recreational, marine, industrial, garden, and/or agricultural products. The embodiment provides an economical balance of a low-permeation material with relatively inexpensive material having relatively lower-temperature elasticity capability.

Referring in detail to the drawings, FIG. 1 schematically illustrates a vehicle 10 including a fuel tank assembly 12 for storing fuel 14 and supplying the fuel 14 through a fuel line 16 to an internal combustion engine 18 that mechanically powers the vehicle 10. The fuel tank assembly 12 includes a fuel tank 20 for housing the fuel 14 and a fuel delivery module or sender unit 22 that is mounted within and to the fuel tank 20, pumps fuel 14 out of the fuel tank 20, and is electrically powered by a vehicle battery 24 via wires 26. The fuel delivery module 22 also includes a float-arm fuel level sensor 28 for sensing the level of the fuel 14 within the fuel tank 20 and sending a signal, via wires 30, indicative of the fuel level to a fuel gage 32 for use or observation by a vehicle driver within a passenger compartment of the vehicle 10.

As generally shown in FIG. 1, the fuel delivery module 22 assembles into an opening 36 through a fuel tank wall 38, wherein a flange 34 of the module 22 is mounted or positioned adjacent or against the fuel tank wall 38, and wherein the flange 34 may be mounted and attached to the fuel tank in any suitable manner but is preferably fastened thereto as will be described herein below. In any case, a fuel reservoir or housing 42 of the fuel delivery module 22 is suspended within the fuel tank 20 from the flange 34, by one or more posts 40. The housing 42 has a fuel inlet 44 to communicate the fuel 14 from within the fuel tank 20 to a fuel filter 46 connected to a fuel inlet 48 of a fuel pump 50. The fuel pump 50 has a fuel outlet 51 that connects to a fuel outlet tube 52 that communicates through a fuel supply fitting 54 of the flange 24 and a fuel line 16 with a manifold and fuel injectors of the engine 18. Electrical leads 55, 56, with associated connectors 58, extend through the flange 34 providing electrical power to an electric motor 60 of the fuel pump 50 and to the fuel level sensor 28. Accordingly, the fuel delivery module 22 is powered by the battery 24 to pump fuel from the fuel tank 20 to the engine 18 and to indicate the level of the fuel within the fuel tank 20 to the fuel gage 32.

The liquid fuel 14 within the fuel tank 20 is composed of highly volatile hydrocarbons that may quickly vaporize and escape to the atmosphere through the flange-type joint between the module 22 and fuel tank 20, if the joint is not suitably sealed. Accordingly, it is desirable to provide a pressure-tight, permeation-free flange-type joint between the module 22 and fuel tank 20, as more specifically shown in FIGS. 2 and 3.

Figure 2:
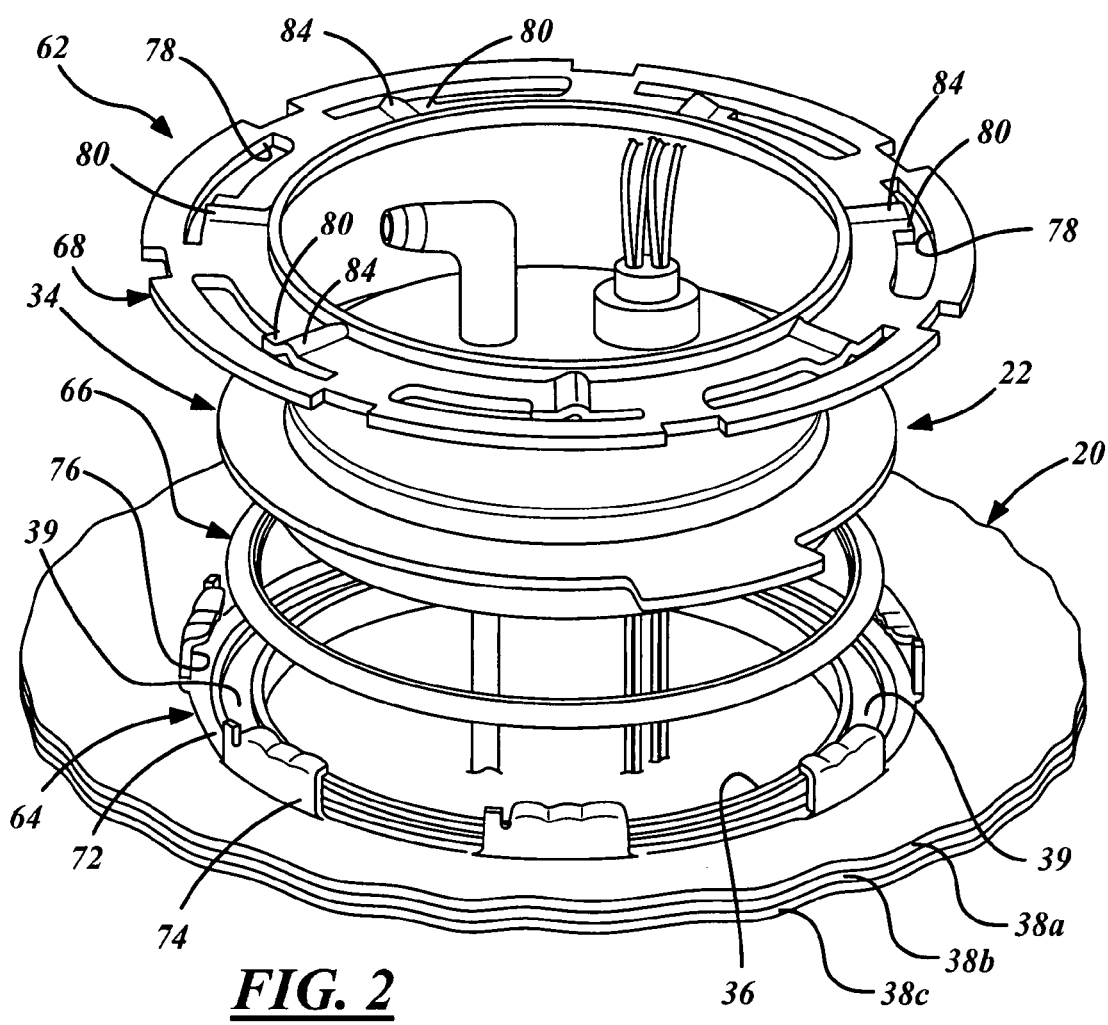
FIG. 2 is an exploded perspective view of the sealed joint of FIG. 1 including the multi-piece seal.

FIG. 2 illustrates an exemplary flange-type joint or flange seal assembly 62 that secures the fuel delivery module 22 to the fuel tank 20. The flange seal assembly 62 includes a ring 64, a multiple-piece static axial seal 66a, the flange 34 of the fuel delivery module 22, and a locking member 68. The ring 64 may be embedded in the fuel tank wall 38 and circumscribes the opening 36.

The flange seal assembly 62 is received in the wall 38 of the plastic fuel tank 20, which may be composed of any suitable fuel tank material such as steel or single-layer plastic, but is preferably composed of multi-layered plastic. As an example, the fuel tank wall 38 may have an outer layer 38a, a permeation barrier layer 38b, and an inner layer 38c, but the wall 38 may include other sub-layers such as adhesive layers to secure the permeation barrier layer 38b to the outer and inner layers, 38a, 38c. Other than the opening 36, the permeation barrier layer 38b is completely encapsulated by the outer and inner layers 38a, 38c, and a portion of the barrier layer 38b is exposed adjacent to and extends continuously around the perimeter of the opening 36.

In assembly, the multi-piece axial seal 66a circumscribes the opening 36 and is preferably disposed in an axially opening circumferential groove 39 in the fuel tank wall 38. Accordingly, the axial seal 66a is a "face seal" or "flange seal". The axial seal 66a is suitable for use with many interfaces between fuel delivery modules and fuel tanks including the bolt-flange type, mason jar type, and the like. The fuel delivery module 22 is inserted into the opening 36 until an axially-extending annulus 34a of the flange 34 fits in the opening 36 and a radially-extending annulus 34b of the flange 34 is positioned against or just adjacent the fuel tank wall 38 to cover the seal 66a and groove 39 such that the seal 66a is between and in sealingly resilient contact with the flange 34 and the outer layer 38a of the fuel tank wall 38 to provide a seal between them. As will be further described herein below, the locking member 68 is then suitably aligned with the ring 64 and assembled over the flange 34 in circumferential slidable engagement with the ring 64.

Figure 3:
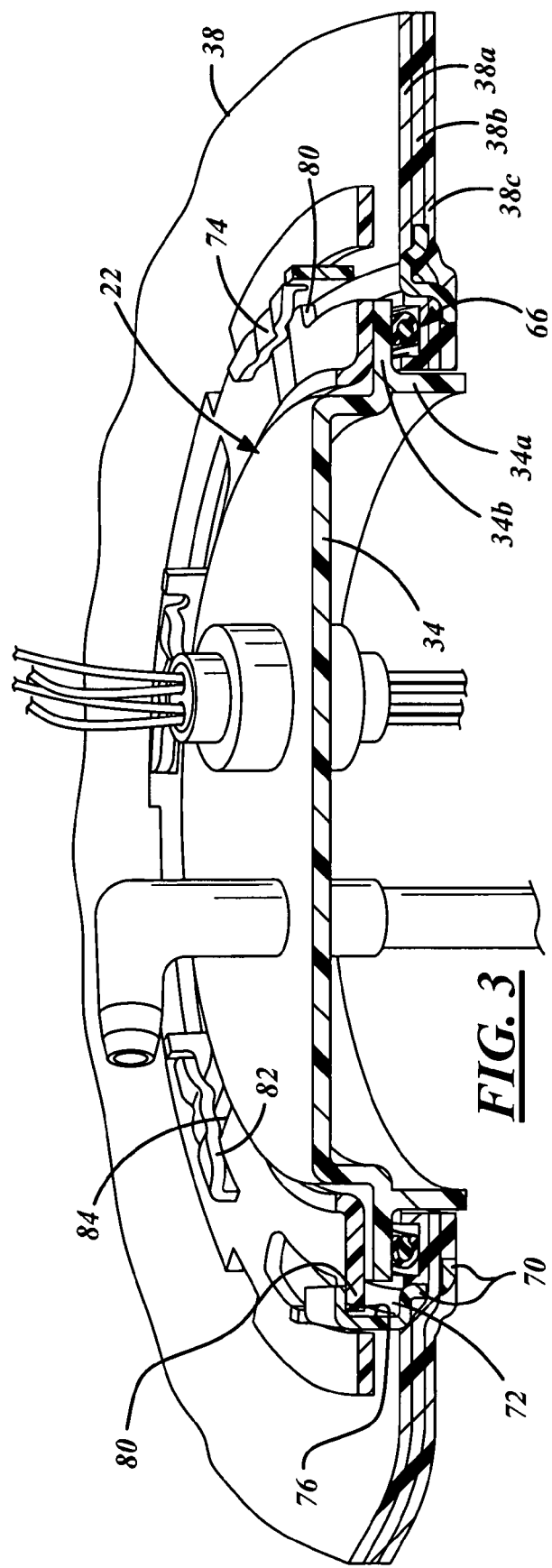
FIG. 3 is an assembled, perspective, cross-sectional view of the sealed joint of FIG. 1 including the multi-piece seal.

As shown in FIG. 3, the ring 64 has a flange 70 that is preferably embedded in and integrally interconnected to the fuel tank wall 38 such as by molding, and an exposed flange 72 that generally projects outside of the fuel tank wall 38. The exposed flange 72 generally extends axially away from the embedded flange 70 and has a plurality of equidistantly spaced tabs 74. For interlocking with the locking member 68, each tab 74 defines a circumferentially extending elongated slot 76. The locking member 68 has a plurality of circumferentially spaced apertures 78 for accepting the tabs 74 of the flange 70 therethrough.

In assembly, the tabs 74 of the ring 64 project through the apertures 78 and, as the locking member 68 is rotated, radially extending flanges 80 of the locking member 68 are received in the slots 76 and thereby retained by the tabs 74 of the ring 64. As shown in FIG. 3, the ring 64 and locking member 68 are further retained in this interlocked position by interengaging projections 82, 84 of the ring 64 and locking member 68 respectively, that are preferably stamped therein. Circumferential interengagement of the locking member 68 with the ring 64 applies an axial force against the flange 34 to compress the resilient seal 66a into firm sealing contact between the fuel module flange 34 and the fuel tank wall 38. Accordingly, the fuel module flange 34 is mounted to the fuel tank wall 38 in the manner set forth above, but may be mounted thereto in any other suitable desired manner.

Figure 4:
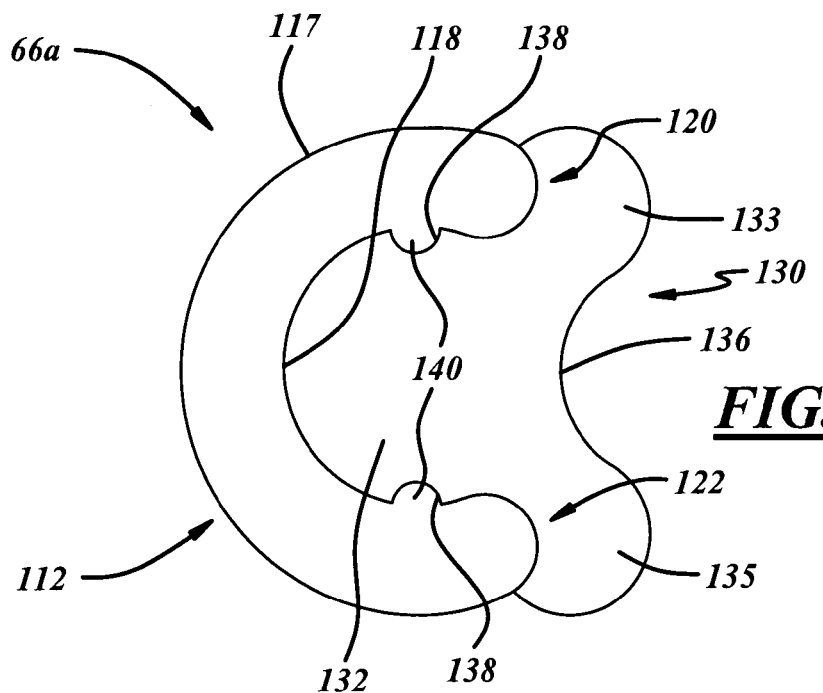
FIG. 4 is a cross-sectional view of a portion of the multi-piece seal shown in an uncompressed state.

FIG. 4 illustrates, in cross section, the multi-piece seal 66a of FIGS. 2 and 3. The seal 66a is preferably substantially annular, ring-shaped, or circumferentially continuous, is substantially circular in cross section, and includes a substantially C-shaped outer member, jacket, or sheath 112.

The sheath 112 may have a body with, in an uncompressed state, a generally C-shaped cross-sectional profile that terminates in opposed free ends 120, 122 and defines a channel 118 that opens radially outwardly. The sheath 112 also defines an outer surface 117 that extends from the end 120 to the end 122. Along the channel 118, the sheath 112 can have a pair of oppositely disposed anti-twisting and/or orientation features in the form of projections 140. The projections can be integral with the sheath and can extend away from the C-shaped body and radially into the channel 118.

The seal 66a can also include an inner member or core 130 disposed in the channel 118 which can have, in an uncompressed state, a cross-sectional profile defining a generally round body 132 having a pair of lobes 133, 135 and a pair of oppositely disposed anti-twisting and/or orientation features in the form of reliefs 138. Each lobe can be formed in one piece with, and extend away from, the body 132 and may be exposed from or extend out of the channel 118. The lobes 133, 135 can lie opposite each other and adjacent a respective end 120, 122. Each lobe 133, 135 may further surround a portion of the associated respective end 120, 122 where it can contiguously follow or overlie an outer surface of that respective end 120, 122. A concave relief channel 136 may be provided between the lobes 133, 135. The channel 136 generally provides a stress-relieving feature and may extend into the channel 118 or may not be so deep. Reliefs 138, on the other hand, can extend radially inward and toward the body 132 to complement and receive the projections 140. And when interengaged as shown in FIGS. 4 and 5, the projections 140 and reliefs 138 enable the sheath 112 and the core 130 to resist twisting or rolling with respect to one another, and also can help retain the position of the core 130 relative to the sheath 112 under compressive forces, a vacuum, or the like.

Figure 5:
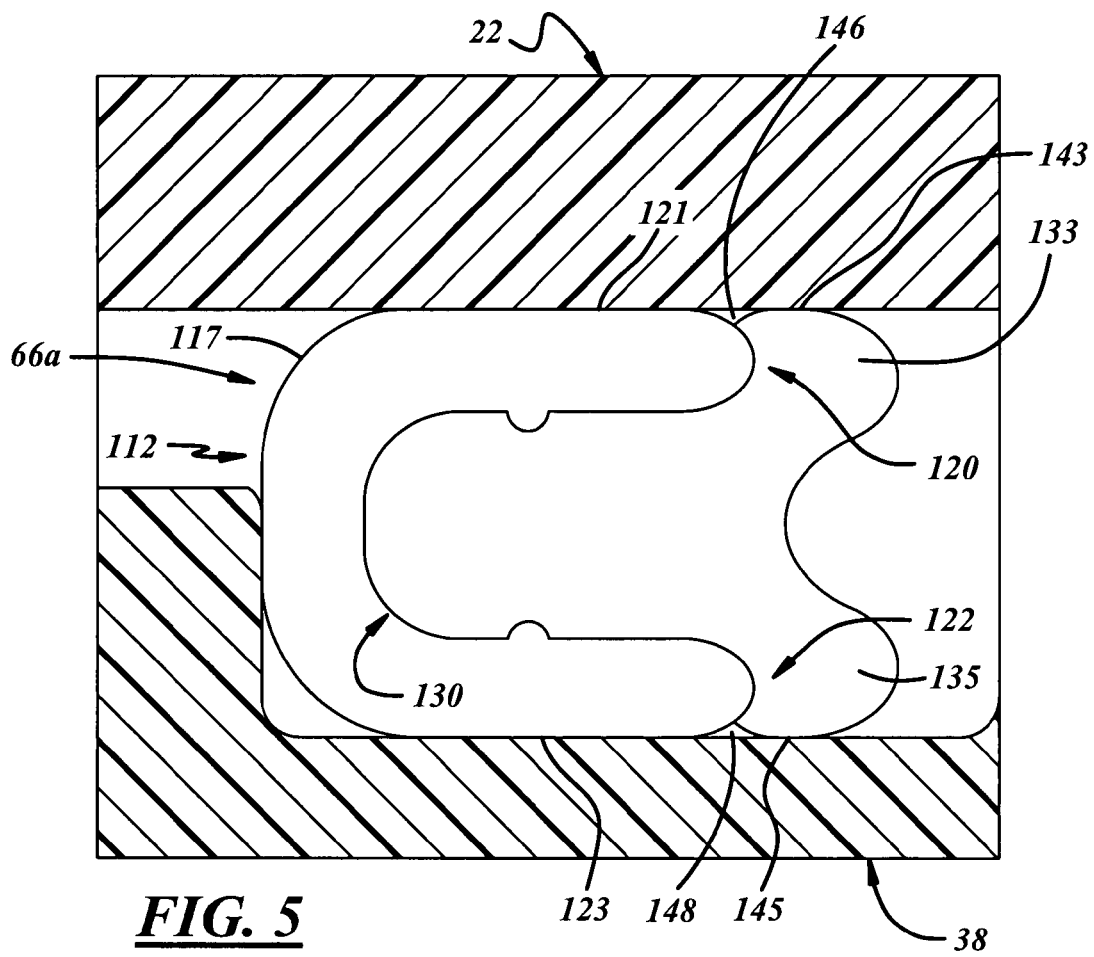
FIG. 5 is a cross-sectional view of the multi-piece seal in a compressed state between the fuel delivery module flange and the fuel tank wall.

FIG. 5 illustrates the seal 66a in a compressed state when it is disposed between a fuel delivery module 22 and a fuel tank wall 38. Here, an upper portion of the outer surface 117 of the sheath 112 can define a primary or first sealing surface 121 against the fuel delivery module 22. This first sealing surface 121 can extend from the free end 120 and continuously along the outer surface 117 until the outer surface 117 no longer touches the fuel delivery module 22. Further, a lower portion of the outer surface 117 of the sheath 112 can define a second sealing surface 123 against the fuel tank wall 38. This second sealing surface 123 can likewise extend from the free end 122 and continuously along the outer surface 117 until the outer surface 117 no longer touches the fuel tank wall 38.

Also in the compressed state, an outer surface of the core 130, specifically the outer surface adjacent the lobe 133, can define a secondary or third sealing surface 143 against the fuel delivery module 22. This third sealing surface 143 can extend continuously along that outer surface wherever the core 130 touches the fuel delivery module 22. Further, the outer surface adjacent the lobe 135 can define a fourth sealing surface 145 against the fuel tank wall 38. This fourth sealing surface 145 can likewise extend continuously along the outer surface wherever the core 130 touches the fuel tank wall 38. The first and third sealing surfaces 121, 143 may be spaced apart with a gap 146 between them. Likewise, the second and fourth sealing surfaces 123, 145 may be spaced apart with a gap 148 between them.

The sheath 112 of the seal 66a can further be composed of a fluorinated elastomer material having greater than ⅔ flourine content, and being capable of providing a seal at temperatures reaching as low as approximately −22° F., by way of example without limitation.

And the core 130 of the seal 66a can further be composed of a nitrile elastomer material that is capable of providing a seal at temperatures reaching as low as approximately −40° to −60° F., by way of example without limitation. The cores can also be composed of an approximately 55 to 70 durometer material with an approximate coefficient of friction of 0.10.

The multi-piece seal of the exemplary form herein provides the following advantages in comparison, for example, to round cross section unitary O-rings composed of low-permeation material: increased low temperature performance and substantially similar permeation resistance; a cross section that enables ready drop-in replacement for any O-ring face seal application; resists seal roll, extrusion, and separation during pressurization of the seal; improved compliance to irregular seal surfaces; protection against splitting of any external coating due to differential swell of dissimilar materials; similar compression and installation loads as single piece O-rings.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the forms thereof, the articles "a," "an," "the," and "said" are intended to mean that there are one or more of the elements.

It is to be understood that the foregoing description is not a description of the invention, but is a description of one or more presently preferred forms of the invention. Accordingly, the invention is not limited to the particular exemplary forms disclosed herein, but rather is defined solely by the claims below. In other words, the statements contained in the foregoing description relate to particular exemplary forms and are not to be construed as limitations on the scope of the invention as claimed below or on the definition of terms used in the claims, except where a term or phrase is expressly defined above or where the statement specifically refers to "the invention."

Although the present invention has been disclosed in conjunction with a limited number of presently preferred exemplary forms, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. Indeed, the present invention is intended to embrace all such forms, ramifications, modifications, variations, substitutions, and/or equivalents as fall within the spirit and broad scope of the following claims.

What is claimed is:

1. A multi-piece axial seal used between a fuel delivery module and a fuel tank wall, comprising:
    an annular outer member when uncompressed having a generally C-shaped cross-section with a pair of axially spaced apart opposed ends an inner channel defined by the inner surface of the outer member, the inner channel opening generally radially between the opposed ends, the outer member composed of a permeation-resistant elastomeric material having an outer surface defining a first sealing surface adjacent one of the ends against the fuel delivery module and a generally opposed second sealing surface adjacent the other of the ends against the fuel tank wall, and within the channel a pair of generally axially opposed annular projections extending into the channel; and
    an annular inner member with a body disposed at least partly within the channel of the outer member, having a pair of generally opposed recesses each complementarily engaged with a respective one of the projections in the channel of the outer member and a pair of lobes extending out of the channel, axially spaced apart and each engaging a respective one of the ends of the outer member, one lobe having an outer surface defining a third sealing surface against the fuel delivery module and spaced from the first sealing surface, the other lobe having an outer surface defining a fourth sealing surface against the fuel tank wall and spaced from the second sealing surface; and the body including the lobes of the body being in one piece and composed of another permeation-resistant elastomeric material.

2. The multi-piece seal of claim 1 wherein the outer member is composed of a fluorinated elastomer having greater than ⅔ fluorine content, and the inner member is composed of a nitride elastomer.

3. The multi-piece seal of claim 1 wherein the inner body in cross-section has a generally round portion disposed in the channel and the pair of lobes is carried by a portion of the body generally radially out of the channel between the ends of the outer member.

4. The multi-piece seal of claim 3 wherein each lobe partly surrounds and is contiguous to an outer surface of an associated one of the ends of the outer member.

5. The multi-piece seal of claim 1 wherein a gap is defined between the second and fourth sealing surfaces.

6. The multi-piece seal of claim 1 wherein a gap is defined between the first and third sealing surfaces.

* * * * *

UNITED STATES PATENT AND TRADEMARK OFFICE
CERTIFICATE OF CORRECTION

PATENT NO.         : 7,784,637 B2                                               Page 1 of 1
APPLICATION NO.    : 11/708892
DATED              : August 31, 2010
INVENTOR(S)        : James R. Osborne It is certified that error appears in the above-identified patent and that said Letters Patent is hereby corrected as shown below:

Column 6
Line 22, after "ends" insert a --,--.

Signed and Sealed this

Twenty-eighth Day of December, 2010

David J. Kappos
*Director of the United States Patent and Trademark Office*